(12) United States Patent  
Ando et al.

(10) Patent No.: US 7,409,868 B2
(45) Date of Patent: Aug. 12, 2008

(54) LOAD DETECTING DEVICE

(75) Inventors: Mitsuhiro Ando, Toyohashi (JP); Shunsuke Kogure, Toyota (JP); Katsuyoshi Shirai, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 79 days.

(21) Appl. No.: 11/373,212

(22) Filed: Mar. 13, 2006

(65) Prior Publication Data

US 2006/0207341 A1 Sep. 21, 2006

(30) Foreign Application Priority Data

Mar. 18, 2005 (JP) ............................. 2005-078855

(51) Int. Cl.
*G01B 7/16* (2006.01)
(52) U.S. Cl. ................ 73/778; 73/862.041; 73/862.626
(58) Field of Classification Search .................. 73/778, 73/862.041, 862.626
See application file for complete search history.

(56) References Cited

U.S. PATENT DOCUMENTS

| | | | | |
|---|---|---|---|---|
| 4,354,132 A * | 10/1982 | Borburgh et al. | ............ | 310/334 |
| 4,356,422 A * | 10/1982 | van Maanen | ................ | 310/322 |
| 5,232,243 A * | 8/1993 | Blackburn et al. | ........... | 280/732 |
| 5,389,848 A * | 2/1995 | Trzaskos | ..................... | 310/322 |
| 5,724,990 A * | 3/1998 | Ogino | ........................ | 600/587 |
| 5,757,104 A * | 5/1998 | Getman et al. | .............. | 310/317 |
| 6,111,338 A * | 8/2000 | Otsuchi et al. | .............. | 310/352 |
| 6,271,760 B1* | 8/2001 | Watanabe et al. | ........... | 340/667 |

FOREIGN PATENT DOCUMENTS

JP 2000-230853 8/2000

* cited by examiner

*Primary Examiner*—Edward Lefkowitz
*Assistant Examiner*—Freddie Kirkland, III
(74) *Attorney, Agent, or Firm*—Buchanan Ingersoll & Rooney PC (57) ABSTRACT

A load detecting device includes a sensor element including a function for generating and detecting a vibration within a single element, the sensor element converting a load or an acceleration into a detection signal, a driving portion for outputting a driving signal for vibrating the sensor element, a vibration detecting portion for extracting the detection signal from the sensor element and for detecting a vibration characteristic value of the sensor element, a wiring for electrically connecting the sensor element, the driving portion and the vibration detecting portion to one another, and for transmitting a superimposed signal constituted by superposition of the driving signal from the driving portion and the detection signal from the sensor element, and a calculating portion for calculating one of or both of a load and an acceleration applied to the sensor element based on the vibration characteristic value from the vibration detecting portion.

14 Claims, 6 Drawing Sheets

No load applied

FIG. 7B

Load applied

FIG. 8

LOAD DETECTING DEVICE

CROSS REFERENCE TO RELATED APPLICATIONS

This application is based on and claims priority under 35 U.S.C. § 119 to Japanese Patent Application No. 2005-078855, filed on Mar. 18, 2005, the entire content of which is incorporated herein by reference.

FIELD OF THE INVENTION

This invention generally relates to a load detecting device. More particularly, this invention pertains to a load detecting device for detecting a load or an acceleration applied to a supporting member.

BACKGROUND

A known load detecting device detects, using a piezoelectric element, not only a presence of a human body but also abnormality in a human body by extracting a human body-specific vibration component caused by heartbeat, breathing, and the like. For example, JP2000-230853A discloses a load detecting device including a vibration detecting means, a vibration characteristics calculating means, and a load calculating means. The vibration detecting means is arranged on a supporting member for supporting a human body and including a vibration generating portion and a vibration detecting portion provided adjacent to each other. The vibration characteristics calculating means calculates vibration characteristics through propagation of vibration generated by the vibration generating portion on the basis of an output signal from the vibration detecting portion. The load calculating means calculates a load applied to the vibration detecting means based on an output signal from the vibration characteristic calculating means. The vibration generating portion and the vibration detecting portion are both constituted by piezoelectric element. The load detecting device can be installed in a small space with the least trouble accordingly.

According to the load detecting device disclosed, however, since vibration is generated by one piezoelectric element and then the vibration is detected by other piezoelectric element, a piezoelectric member for generating vibration and a piezoelectric member for detecting the vibration are separately required. Thus, in order to measure distribution of load applied to a face of the supporting member and the like, a great number of pair of piezoelectric members for generating and detecting the vibration are necessary, which leads to complication of a structure and increase of a cost of the device.

Thus, a need exists for a load detecting device whose structure remains simple at a time of detection of distribution of load, and cost can be decreased.

SUMMARY OF THE INVENTION

According to an aspect of the present invention, a load detecting device includes a sensor element arranged on a supporting member and including a function for generating and detecting a vibration within a single element, the sensor element converting a load or an acceleration applied to the supporting member into a detection signal, a driving portion for outputting a driving signal for vibrating the sensor element, a vibration detecting portion for extracting the detection signal from the sensor element and for detecting a vibration characteristic value of the sensor element based on the detection signal extracted, a wiring for electrically connecting the sensor element, the driving portion and the vibration detecting portion to one another, and for transmitting a superimposed signal constituted by superposition of the driving signal from the driving portion and the detection signal from the sensor element, and a calculating portion for calculating one of or both of a load and an acceleration applied to the sensor element based on the vibration characteristic value from the vibration detecting portion.

According to another aspect of the present invention, a load detecting device includes a plurality of sensor elements arranged on a supporting member and including a function for generating and detecting a vibration within a single element, the sensor element converting a load and an acceleration applied to the supporting member into a detection signal, a driving portion for outputting a driving signal for vibrating the sensor element, a vibration detecting portion for extracting the detection signal from the sensor element and for detecting a vibration characteristic value of the sensor element based on the detection signal extracted, a calculating portion for calculating one of or both of a load and an acceleration applied to the sensor element based on the vibration characteristic value from the vibration detecting portion, and for outputting a switching signal for switching an electric connection state with a predetermined sensor element, a connection switching portion connected to each sensor element by means of a first wiring and for switching an electric connection state with the first wiring based on the switching signal from the calculating portion, a second wiring for electrically connecting the connection switching portion, the driving portion and the vibration detecting portion to one another and for transmitting a superimposed signal constituted by the driving signal from the driving portion and the detection signal from the sensor element, and a third wiring for electrically connecting the calculating portion and the connection switching portion to each other.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
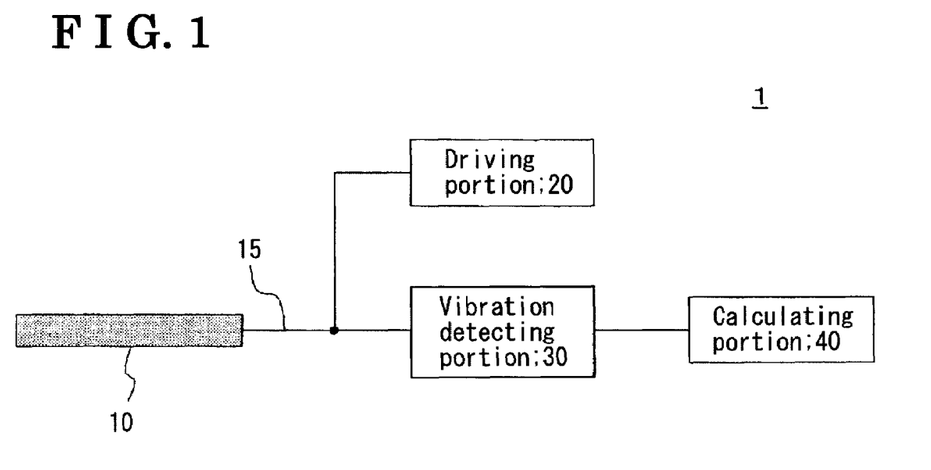
FIG. 1 is a block diagram of a structure of a load detecting device according to a first embodiment of the present invention.
Figure 2:
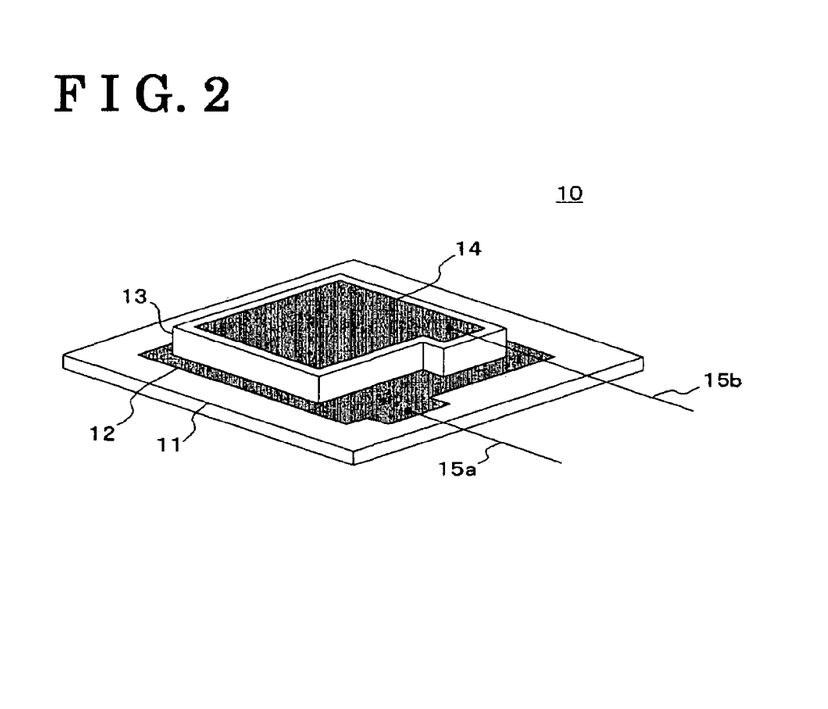
FIG. 2 is a perspective view of a sensor element of the load detecting device according to the first embodiment of the present invention.
Figure 3:
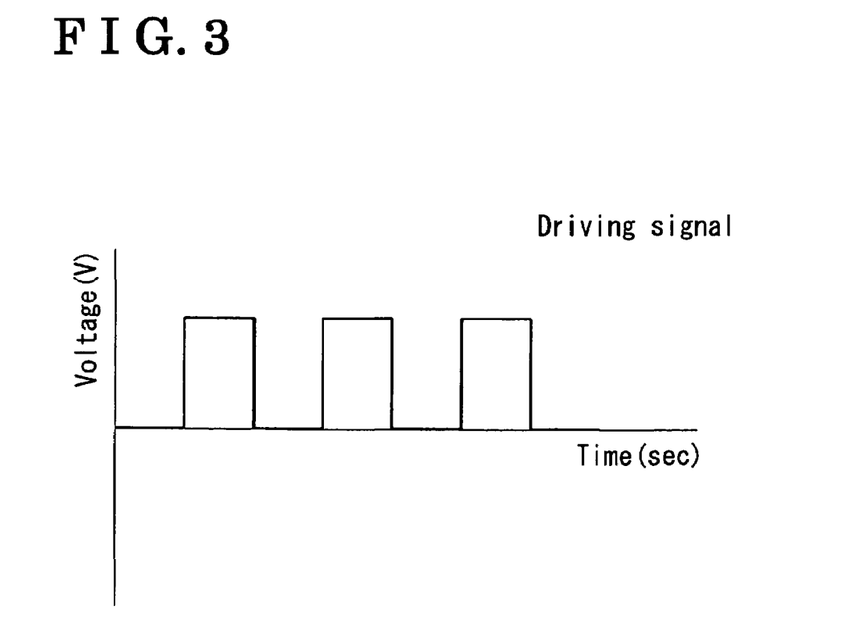
FIG. 3 is a graph showing a waveform of a driving signal of the load detecting device according to the first embodiment of the present invention.
Figure 4:
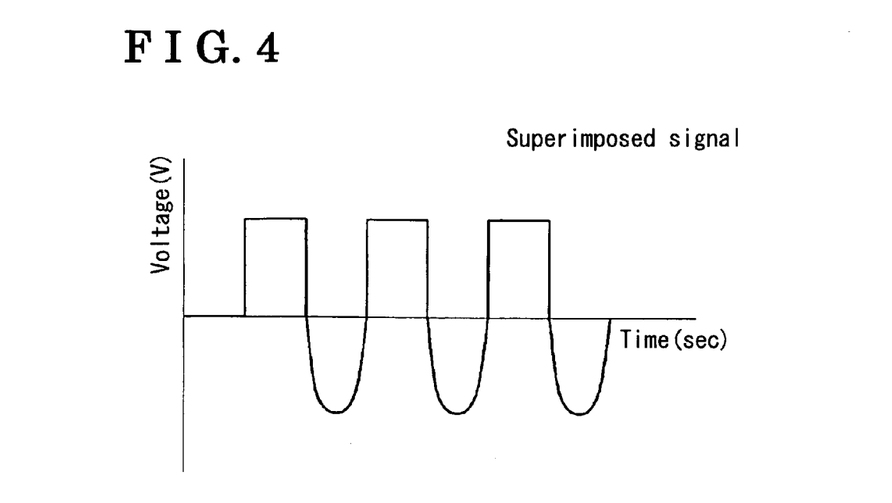
FIG. 4 is a graph showing a waveform of an electrical signal on a wiring of the load detecting device according to the first embodiment of the present invention.
Figure 5A:
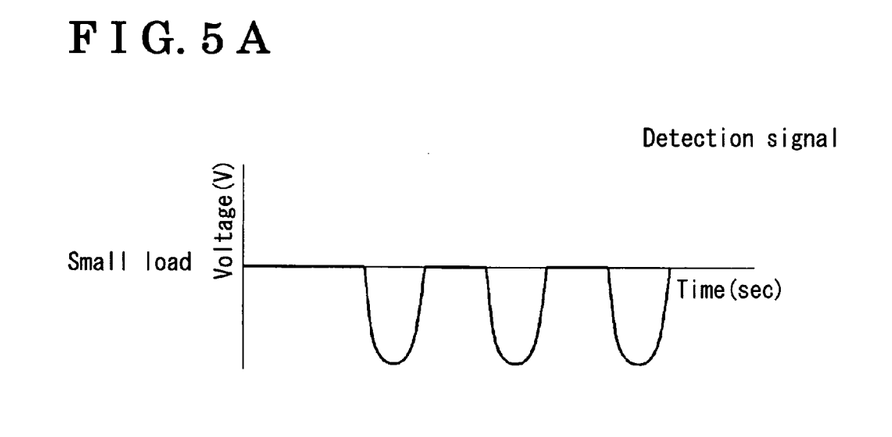
FIGS. 5A and 5B are graphs each showing a waveform of a detection signal of the load detecting device according to the first embodiment of the present invention.
Figure 5B:
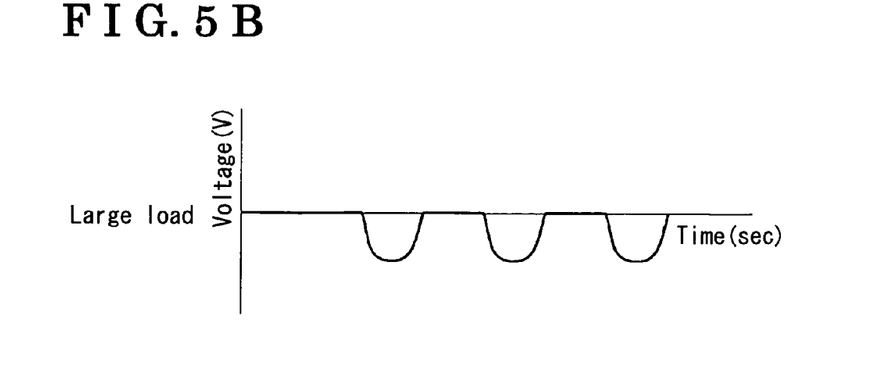
Figure 6:
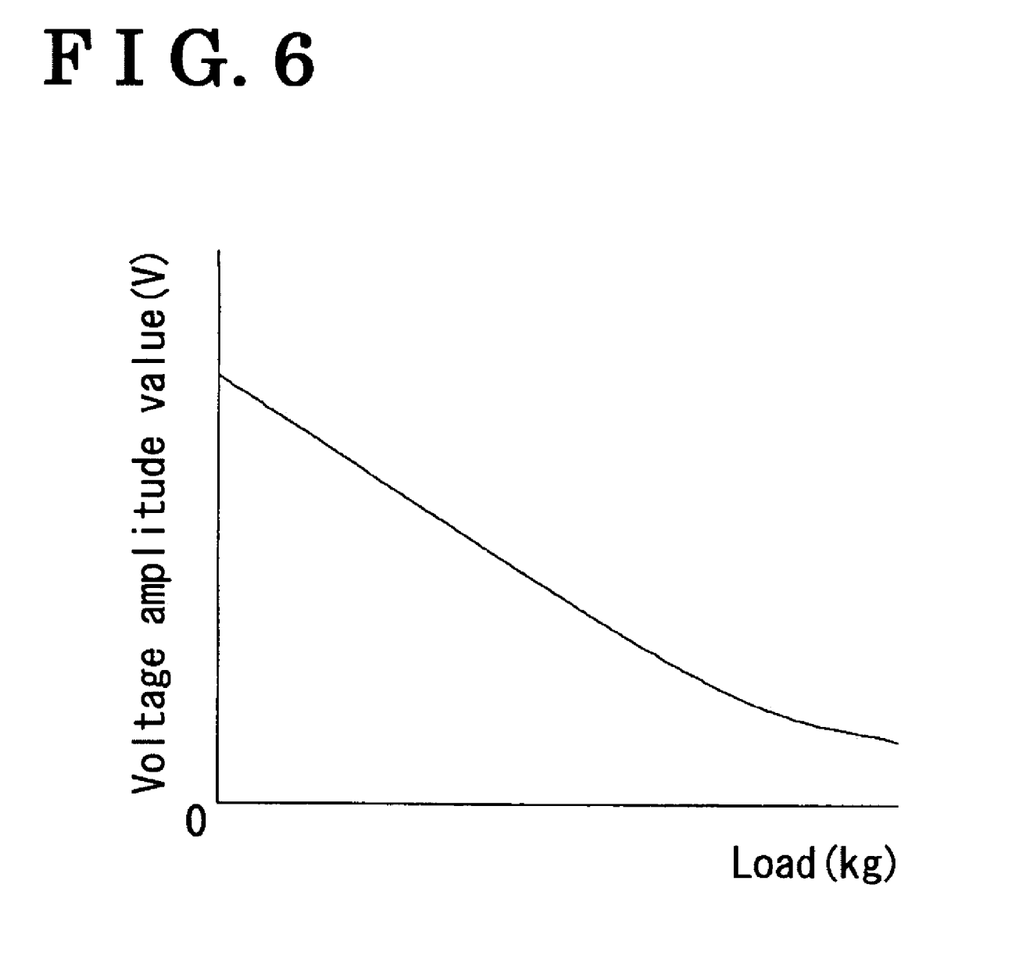
FIG. 6 is a graph showing a characteristics of relationship between a load and a voltage amplitude value according to the first embodiment of the present invention.

A first embodiment of a load detecting device is explained with reference to the attached drawings. FIG. 1 is a block diagram showing a structure of the load detecting device according to the first embodiment. FIG. 2 is a perspective view of a sensor element of the load detecting device. FIG. 3 is a graph showing a waveform of a driving signal of the load detecting device. FIG. 4 is a graph showing a waveform of an electric signal on a wiring of the load detecting device. FIGS. 5A and 5B are graphs each showing a waveform of a detection signal of the load detecting device. FIG. 6 is a graph showing a characteristic of relationship between a load and a voltage amplitude value of the load detecting device.

A load detecting device 1 detects a load or an acceleration (i.e. rate of load change) applied to a supporting member such as a seating face and a seatback of a vehicular seat and a chair for supporting a human body. As shown in FIG. 1, the load detecting device 1 includes a sensor element 10, a driving portion 20, a vibration detecting portion 30, and a calculating portion 40.

The sensor element 10 is arranged on the supporting member for supporting a human body so as to convert a load or an acceleration applied to the supporting member into a detection signal. The sensor element 10 has a function for generating and detecting vibration within a single element. The sensor element 10 is constituted by at least one cell attached onto a board 11. The cell includes a piezoelectric member 13 whose upper and lower faces are equipped with a first electrode 12 and a second electrode 14 respectively as shown in FIG. 2. A wiring 15a is electrically connected to the first electrode 12 while a wiring 15b is electrically connected to the second electrode 14 as shown in FIG. 2. It is preferred that one of the wirings 15a and 15b is earthed. When a driving voltage is periodically applied between the first electrode 12 and the second electrode 14 from the driving portion 20, the piezoelectric member 13 is expanded or contracted, which causes deflection or deformation of the board 11. Further, on the contrary, when the board 11 is deflected or deformed because of a load or an acceleration applied from the outside, the piezoelectric member 13 is also deformed. An electric potential difference is generated between the first electrode 12 and the second electrode 14 and then a detection signal related to the load or the acceleration is output from the sensor element 10.

As shown in FIGS. 1 and 3, the driving portion 20 causes the sensor element 10 to vibrate so that the deflection or deformation thereof is caused by periodically applying a driving voltage, i.e. by outputting a driving signal, to the sensor element 10. The driving portion 20 periodically applies the driving voltage at a predetermined level to the sensor element 10. The driving portion 20 is electrically connected to a wiring 15 such as the wiring 15a and the wiring 15b, during a period in which the driving portion 20 outputs the driving voltage. The driving portion 20 is electrically disconnected from the wiring 15 during a period in which the driving portion 20 does not output the driving voltage. At this time, an on/off cycle of the driving voltage, i.e. frequency of the driving voltage, can be used as a resonance frequency of the sensor element 10 so as to effectively vibrate the sensor element 10.

The vibration detecting portion 30 converts a detection signal from the sensor element 10 into a voltage amplitude value. As shown in FIGS. 4 and 5, the vibration detecting portion 30 that is electrically connected to the wiring 15 extracts a detection signal sent from the sensor element 10 among an input signal to the vibration detecting portion 30 which includes a driving signal from the driving portion 20, i.e. a superimposed signal, for the purposes of converting the detection signal extracted into a vibration characteristic value such as a voltage amplitude value. At this time, in the detection signal, a peak of voltage (i.e. detection voltage) is downwardly large when a load is small as shown in FIG. 5A while a peak of voltage is downwardly small when a load is large as shown in FIG. 5B.

The calculating portion 40 calculates a load based on a voltage amplitude value from the vibration detecting portion 30. The calculating portion 40 that is electrically connected to the vibration detecting portion 30 by means of a wiring calculates a load corresponding to a voltage amplitude value from the vibration detecting portion 30 based on a map as shown in FIG. 6. At this time, the voltage amplitude value is maximized when the load is zero, and is decreased in association with increase of the load.

Figure 7A:
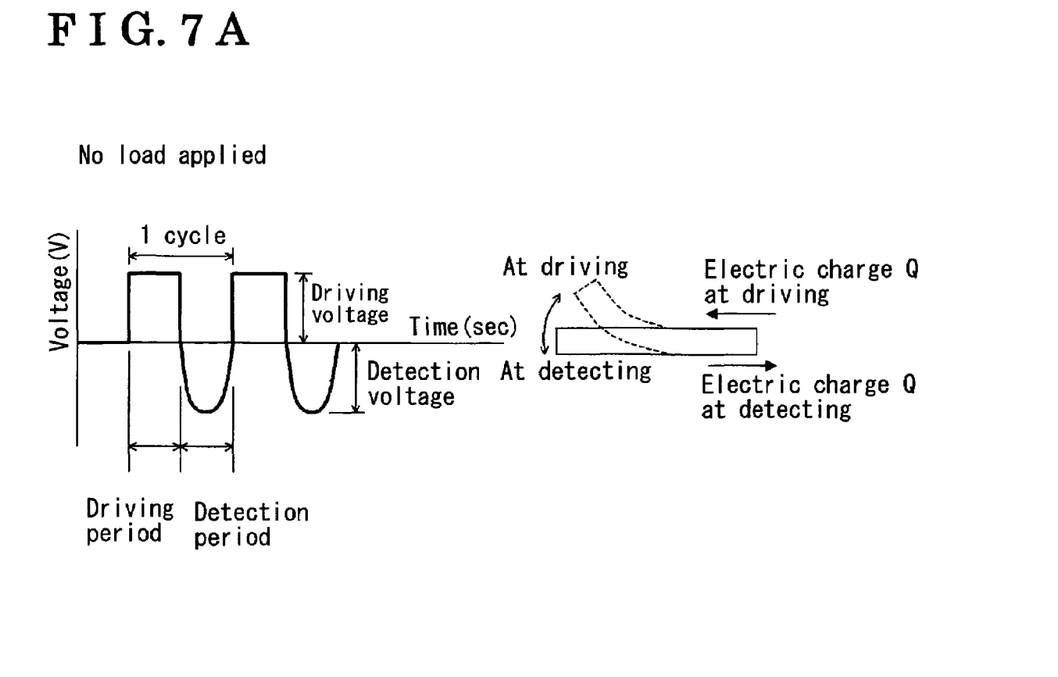
FIGS. 7A and 7B are views each showing a principle of the load detecting device according to the first embodiment of the present invention.
Figure 7B:
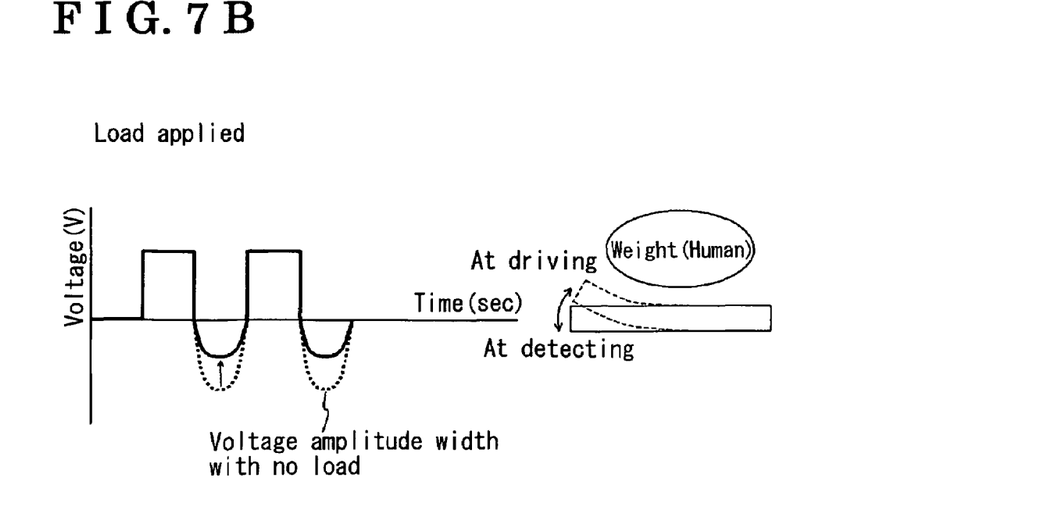

Next, an operation of the load detecting device 1 according to the first embodiment is explained below. FIGS. 7A and 7B are views for each explaining a principle of the load detecting device 1 of the present embodiment.

The sensor element 10 is deflected or deformed because of application of a predetermined driving voltage. In this case, the deformation amount of the sensor element 10 depends on a load applied thereto. Further, when the driving voltage is turned off, the sensor element 10 returns to its initial state with the load applied thereto. At this time, an electric charge in response to the deformation amount of the sensor element 10 previously obtained (which corresponds to a detection signal) is output from the sensor element 10. Accordingly, the deformation amount of the sensor element 10 is acquired by measuring the electric charge from the sensor element 10 after the driving voltage is turned off. In other wards, the deformation amount of the sensor element 10 is acquired by measuring the electric potential difference between the first electrode 12 and second electrode 14. The load applied to the sensor element 10 is eventually obtained.

A method of driving and detection performed by the sensor element 10 for measuring a load applied thereto on the basis of the aforementioned principle is explained below. During a predetermined period in one cycle of the driving voltage from the driving portion 20 specified by the resonance frequency of the sensor element 10, which is defined as a driving period, the driving voltage is applied to the sensor element 10 from the driving portion 20 by means of the wiring 15 as shown in FIG. 7A. At this time, the sensor element 10 is deflected or deformed to a point at which a deflection force generated by the driving voltage and a load applied to the sensor element 10 are balanced out. The deflection of the sensor element 10 is small when the load is large as shown in FIG. 7B and is large when the load is small as shown in FIG. 7A When the driving period is finished, the driving portion 20 is disconnected from the wiring 15. Thus, the deflection force in the sensor element 10 disappears, which cause the sensor element 10 to return to the initial state (i.e. initial position) thereof. At this time, an electric charge Q in response to the deformation amount obtained in the driving period is output from the sensor element 10. During a detection period, which is a period other than the driving period in one cycle of the driving voltage, the electric charge Q (the electric potential difference between the first electrode 12 and the second electrode 14) is output as a detection signal from the sensor element 10 and transmitted to the vibration detecting portion 30 by means of the wiring 15. Then, the detection signal is converted into a voltage amplitude value by the vibration detecting portion 30. The load is calculated accordingly by the calculating portion 40 on the basis of the voltage amplitude value obtained.

In case of only detecting an acceleration applied to the sensor element 10, the function of the driving portion 20 is deactivated. Then, an amount of electric charge from the sensor element 10 (the electric potential difference between the first electrode 12 and the second electrode 14) is measured by the vibration detecting portion 30, and the electric charge measured is converted into the acceleration by the calculating portion 40.

Further, in cases where a load and an acceleration are simultaneously applied to the sensor element 10, a composite waveform that combines load-dependent and acceleration-dependent voltage waveform is output from the vibration detecting portion 30. Then, frequency separation is conducted on the composite waveform by the calculating portion 40 to thereby enable detection of the load and the acceleration at the same time.

According to the first embodiment, a driving signal and a detection signal of the sensor element 10 are transmitted in a superimposed manner, i.e. as a superimposed signal. Thus, a vibration generating portion and a vibration detecting portion can be constituted by a single sensor element which is conventionally constituted separately and individually. The sensor element 10 and the wiring can be simplified, which leads to a reduction of cost.

Figure 8:
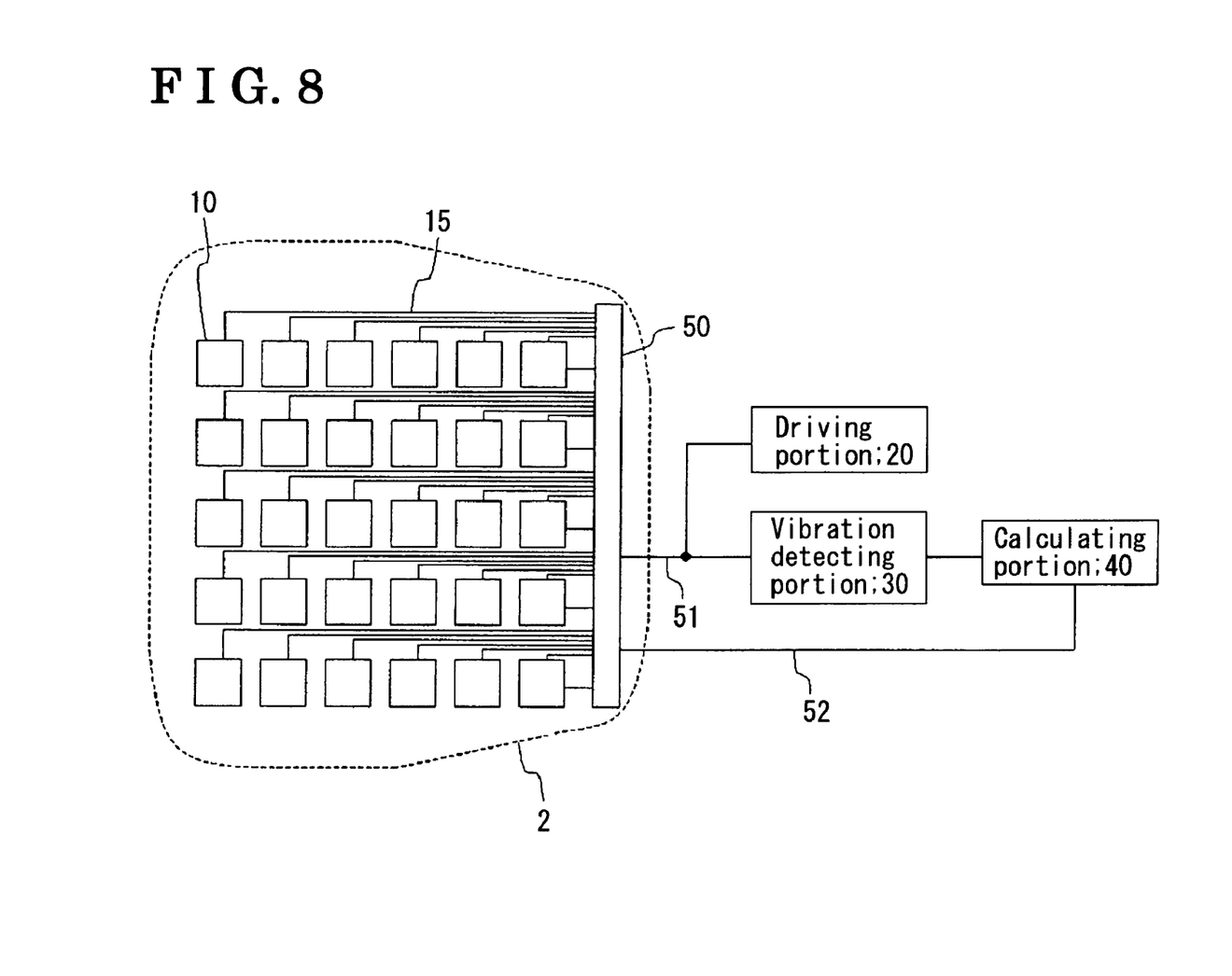
FIG. 8 is a block diagram of a structure of the load detecting device according to a second embodiment of the present invention.

A second embodiment of the load detecting device is explained with reference to FIG. 8. FIG. 8 is a block diagram showing a structure of the load detecting device according to the second embodiment.

According to the second embodiment, multiple sensor elements 10 are arranged on a supporting member 2 such as a seating face of a vehicular seat. In addition, each sensor element 10 is electrically connected to a connection switching portion 50 by means of a first wiring 15. The connection switching portion 50 is also electrically connected to the driving portion 20 and the vibration detecting portion 30 by means of a second wiring 51, and to the calculating portion 40 by means of a third wiring 52. Structures of the sensor element 10, the driving portion 20, and the vibration detecting portion 30 according to the second embodiment are same as those according to the first embodiment.

The calculating portion 40 calculates a load applied to the sensor elements 10 based on a voltage amplitude value from the vibration detecting portion 30. The calculating portion 40 is electrically connected to the vibration detecting portion 30 by means of a wiring so as to calculate a load corresponding to the voltage amplitude value from the vibration detecting portion 30 based on a map, as in the same way as the first embodiment. The calculating portion 40 outputs a switching signal for switching an electric connection state with a specified sensor element 10.

The connection switching portion 50 switches the electric connection state with the first wiring 15 on the basis of a switching signal from the calculating portion 40. The connection switching portion 50 is electrically connected to the driving portion 20 and the vibration detecting portion 30 by means of the second wiring 51. Further, the connection switching portion 50 is electrically connected to the calculating portion 40 by means of the third wiring 52.

An operation of the load detecting device according to the second embodiment is explained below. The connection switching portion 50 is first operated by means of a switching signal from the calculating portion 40. Then, the connection switching portion 50 connects the specified sensor element 10, and the driving portion 20 and the vibration detecting portion 30 one another so that a voltage amplitude value is input from the vibration detecting portion 30 to the calculating portion 40. The load on the specified sensor element 10 is calculated accordingly. This operation is sequentially conducted on the respective sensor elements 10 so as to measure distribution of load on a face of the supporting member 2.

According to the aforementioned second embodiment, measurement of load distribution with high resolution can be achieved by the arrangement of multiple sensor elements 10 on a desired area.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detecting device comprising:
 a sensor element arranged on a supporting member to effect both vibration-generation and vibration-detection, the sensor element including only one piezoelectric member, and first and second electrodes on opposite surfaces of the only one piezoelectric member, respectively, the sensor element converting a load or an acceleration applied to the supporting member into a detection signal;
 a driving portion for outputting a driving signal for vibrating the sensor element;
 a vibration detecting portion for extracting the detection signal from the sensor element and for detecting a vibration characteristic value of the sensor element based on the detection signal extracted;
 a wiring for electrically connecting the sensor element, the driving portion and the vibration detecting portion to one another, and for transmitting a superimposed signal constituted by superposition of the driving signal from the driving portion and the detection signal from the sensor element; and
 a calculating portion for calculating one of or both of a load and an acceleration applied to the sensor element based on the vibration characteristic value from the vibration detecting portion.

2. A load detecting device according to claim 1, wherein a cycle of the superimposed signal is divided into a driving period in association with the driving signal and a detection period in association with the detection signal.

3. A load detecting device according to claim 1, wherein a cycle of the superimposed signal is divided into a driving period in association with the driving signal and a detection period in association with the detection signal.

4. A load detecting device according to claim 1, wherein the driving portion periodically applies as the driving signal a driving voltage at a predetermined level between the first electrode and the second electrode of the sensor element.

5. A load detecting device according to claim 4, wherein the vibration detecting portion extracts as the detection signal a voltage between the first electrode and the second electrode obtained when the driving voltage is not applied to the sensor element.

6. A load detecting device according to claim 5, wherein a frequency of the driving voltage corresponds to a resonance frequency of the sensor element.

7. A load detecting device according to claim 4, wherein a frequency of the driving voltage corresponds to a resonance frequency of the sensor element.

8. A load detecting device comprising:
- a plurality of sensor elements arranged on a supporting member, each sensor element effecting both vibration-generation and vibration-detection, each sensor element including only one piezoelectric member, and first and second electrodes on opposite surfaces of the only one piezoelectric member, respectively, each of the sensor elements converting a load and an acceleration applied to the supporting member into a detection signal;
- a driving portion for outputting a driving signal for vibrating each of the sensor elements;
- a vibration detecting portion for extracting the detection signal from each of the sensor elements and for detecting a vibration characteristic value of each of the sensor elements based on the detection signal extracted;
- a calculating portion for calculating one of or both of a load and an acceleration applied to the sensor elements based on the vibration characteristic value from the vibration detecting portion, and for outputting a switching signal for switching an electric connection state with a predetermined sensor element;
- a connection switching portion electrically connected to each sensor element by a first wiring and for switching an electric connection state with the first wiring based on the switching signal from the calculating portion;
- a second wiring for electrically connecting the connection switching portion, the driving portion and the vibration detecting portion to one another and for transmitting a superimposed signal constituted by the driving signal from the driving portion and the detection signal from the sensor element; and
- a third wiring for electrically connecting the calculating portion and the connection switching portion to each other.

9. A load detecting device according to claim 8, wherein a cycle of the superimposed signal is divided into a driving period in association with the driving signal and a detecting period in association with the detection signal.

10. A load detecting device according to claim 8, wherein a cycle of the superimposed signal is divided into a driving period in association with the driving signal and a detection period in association with the detection signal.

11. A load detecting device according to claim 8, wherein the driving portion applies as the driving signal a driving voltage at a predetermined level between the first electrode and the second electrode of each sensor element.

12. A load detecting device according to claim 11, wherein the vibration detecting portion extracts as the detection signal a voltage between the first electrode and the second electrode obtained when the driving voltage is not applied to the sensor element.

13. A load detecting device according to claim 12, wherein a frequency of the driving voltage corresponds to a resonance frequency of the sensor element.

14. A load detecting device according to claim 11, wherein a frequency of the driving voltage corresponds to a resonance frequency of the sensor element.

* * * * *